Feb. 10, 1942. T. GORMAN, JR 2,272,700
BAIL FABRICATING AND ATTACHING MACHINE
Filed May 17, 1941 8 Sheets-Sheet 1
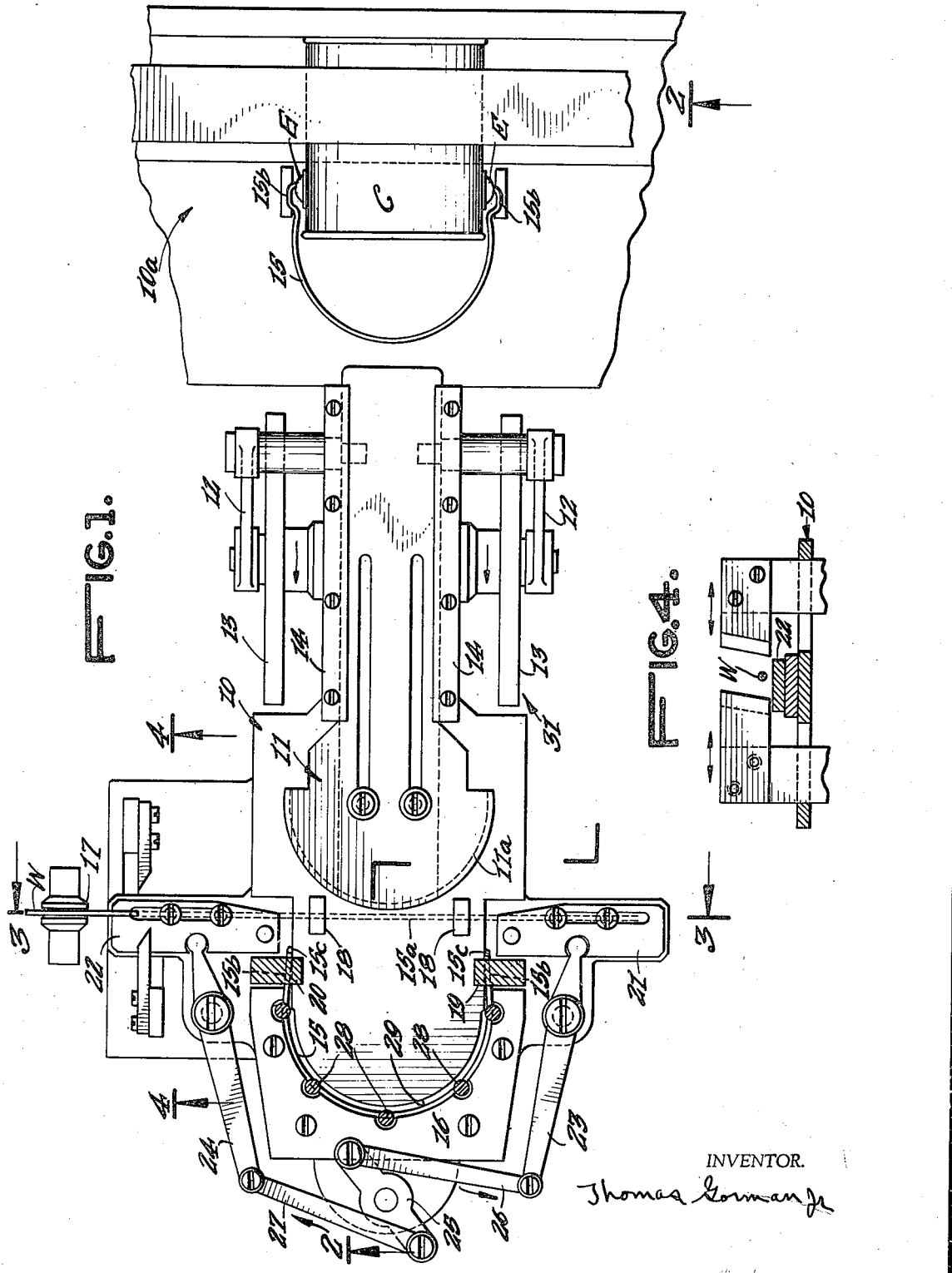
INVENTOR.
Thomas Gorman Jr Feb. 10, 1942.   T. GORMAN, JR   2,272,700
BAIL FABRICATING AND ATTACHING MACHINE
Filed May 17, 1941   8 Sheets-Sheet 2
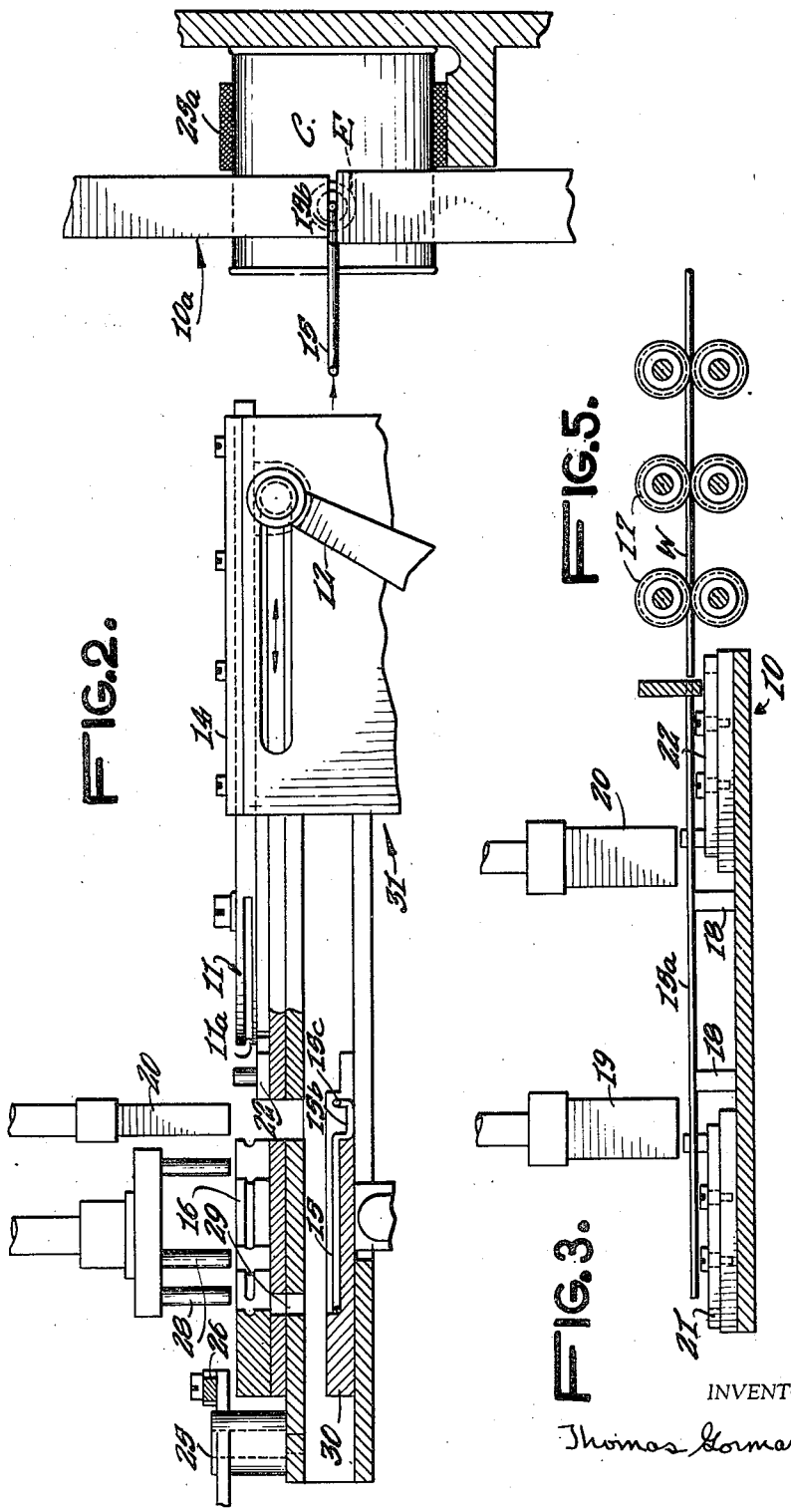
INVENTOR.
Thomas Gorman Jr Feb. 10, 1942.  T. GORMAN, JR  2,272,700
BAIL FABRICATING AND ATTACHING MACHINE
Filed May 17, 1941  8 Sheets-Sheet 3
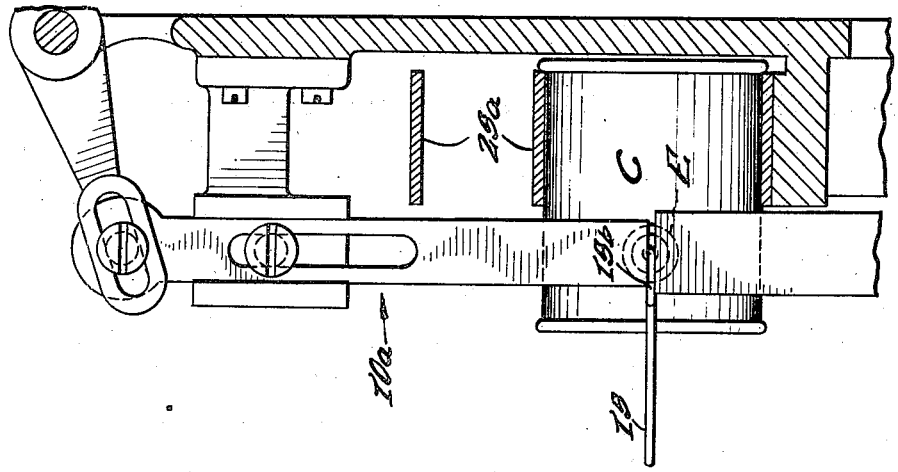
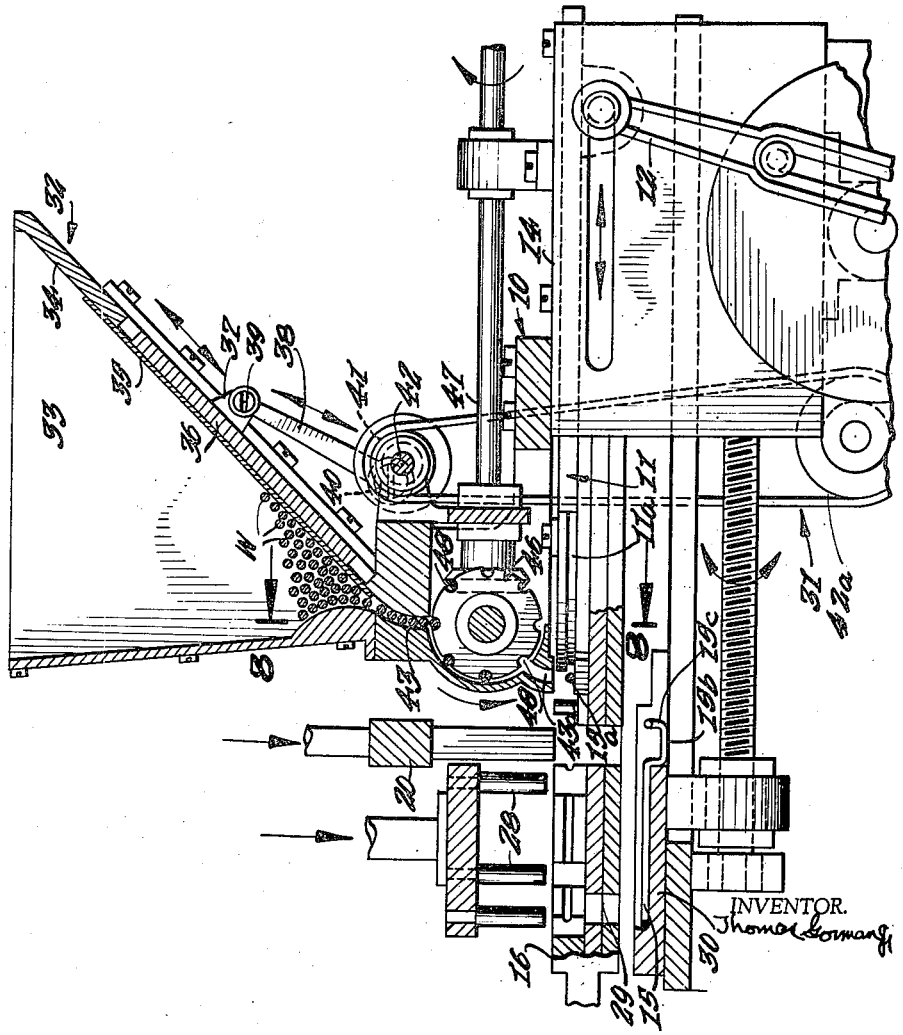
Fig. 6.
INVENTOR.
Thomas Gorman Jr.

Feb. 10, 1942. T. GORMAN, JR 2,272,700
BAIL FABRICATING AND ATTACHING MACHINE
Filed May 17, 1941 8 Sheets-Sheet 4
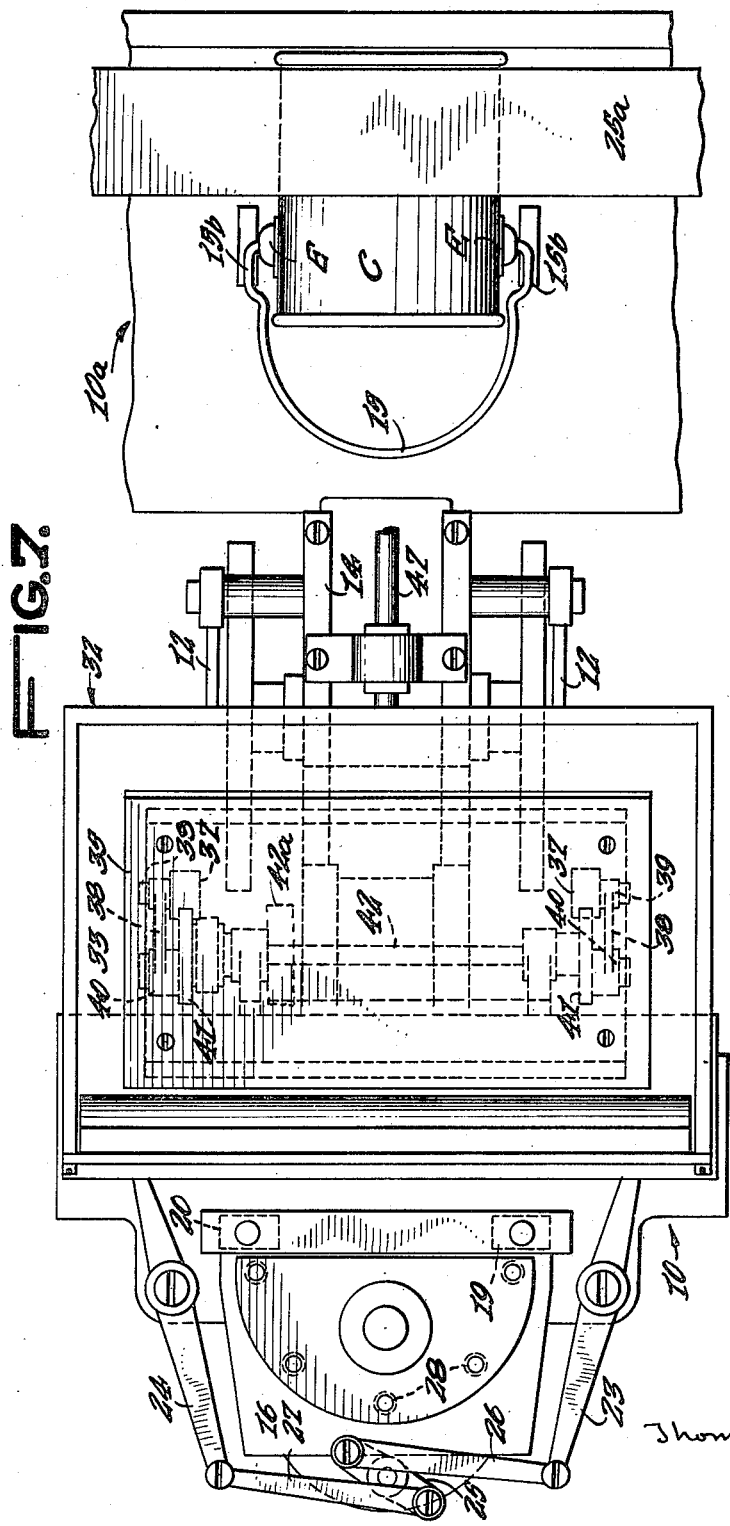
INVENTOR.
Thomas Gorman Jr

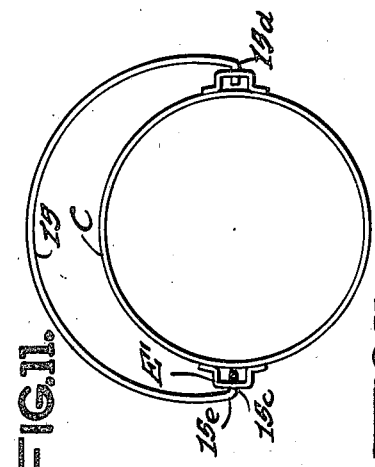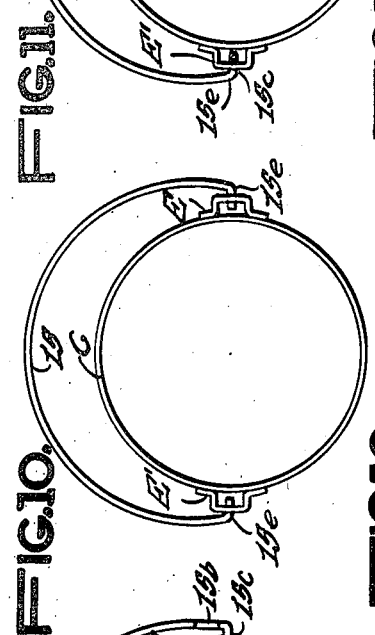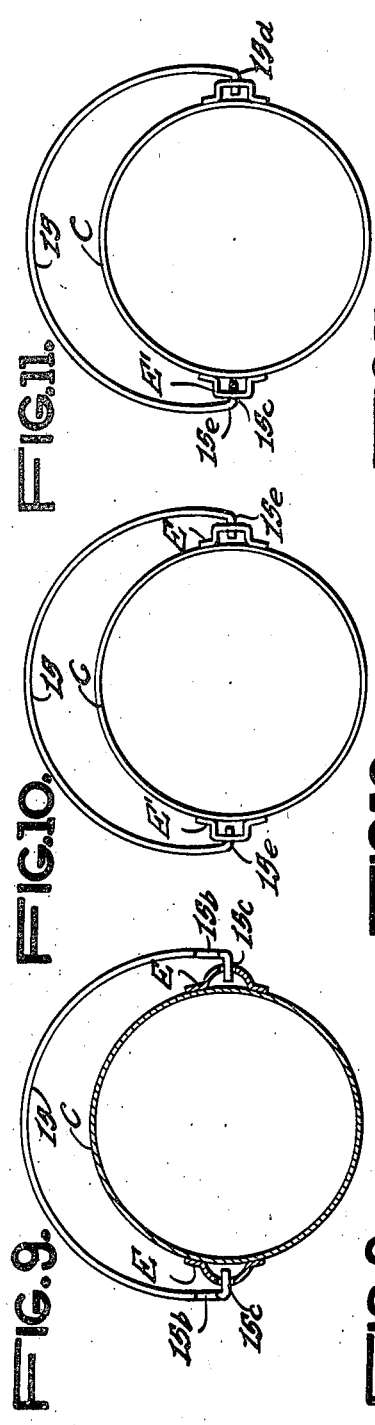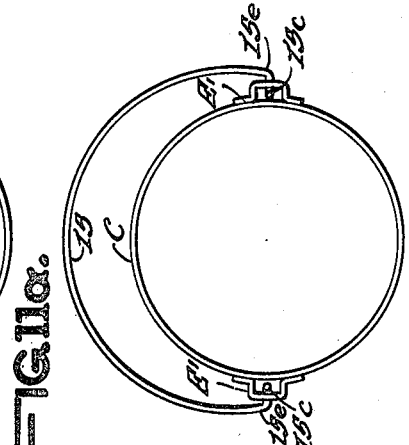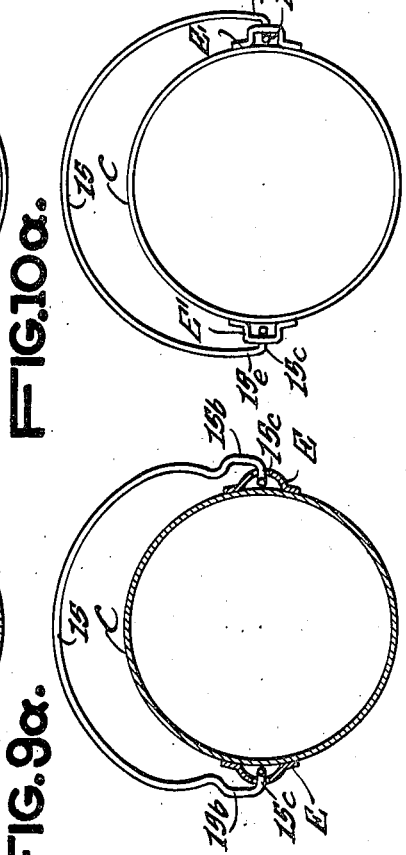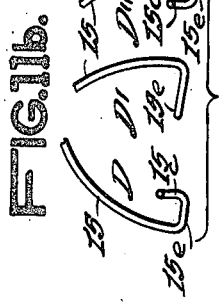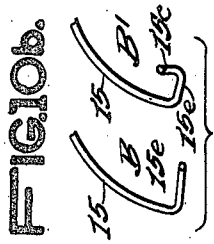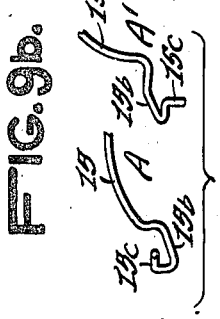

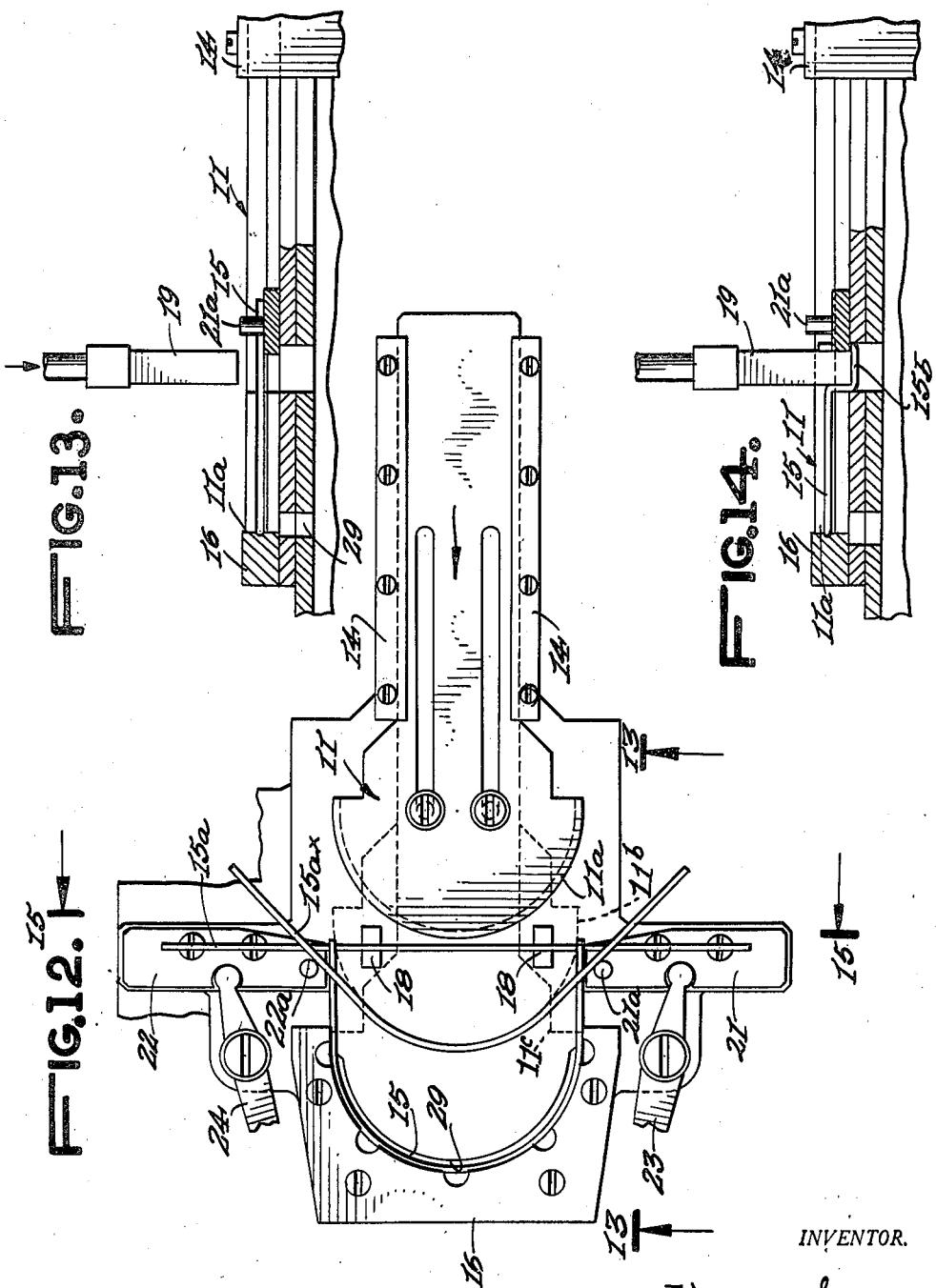

Feb. 10, 1942. T. GORMAN, JR 2,272,700
BAIL FABRICATING AND ATTACHING MACHINE
Filed May 17, 1941 8 Sheets-Sheet 7
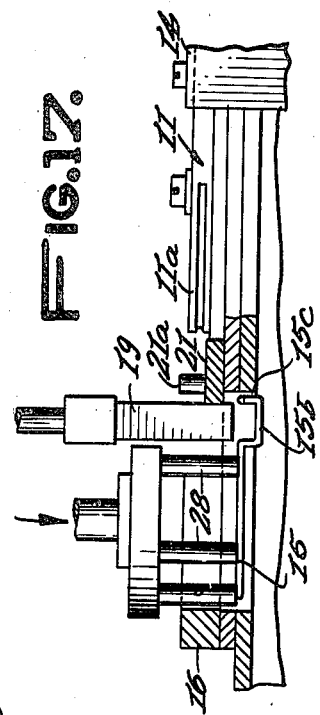
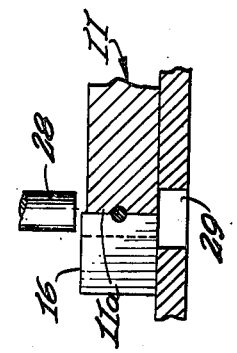
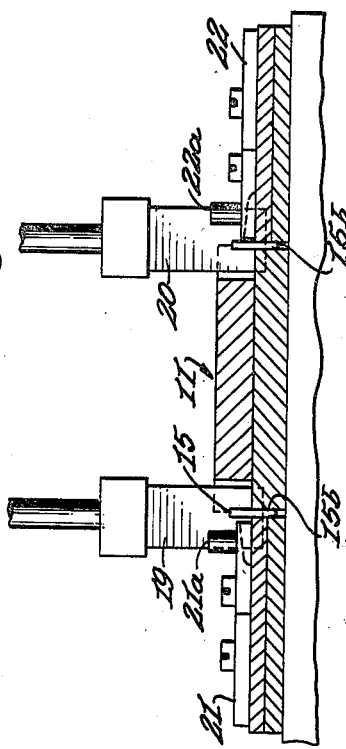
INVENTOR.
Thomas Gorman Jr

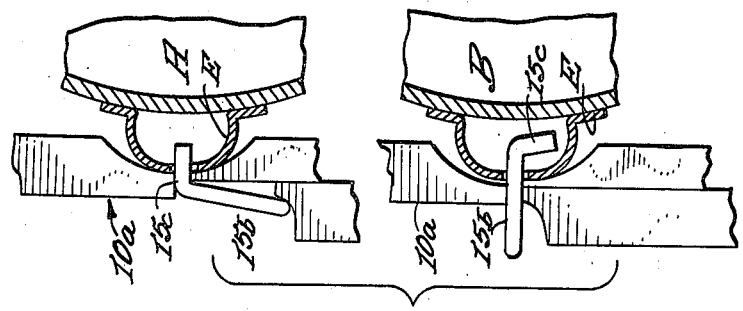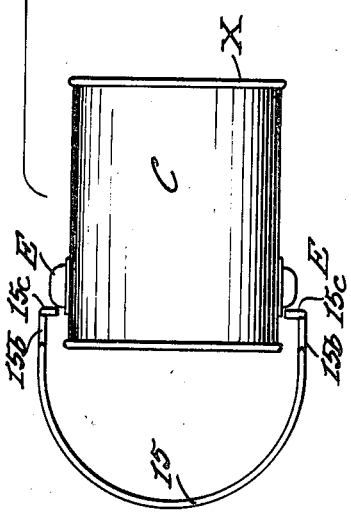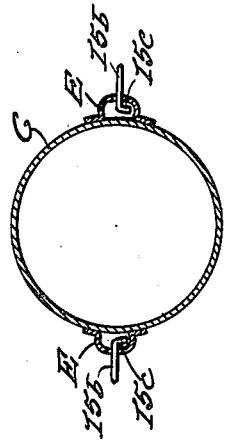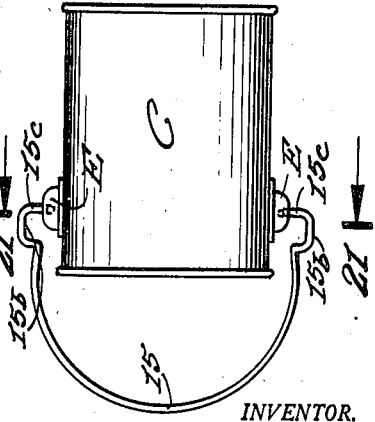

Patented Feb. 10, 1942

2,272,700

UNITED STATES PATENT OFFICE 2,272,700

BAIL FABRICATING AND ATTACHING MACHINE

Thomas Gorman, Jr., Newark, N. J.

Application May 17, 1941, Serial No. 393,874

4 Claims. (Cl. 140—93)

This invention relates to the types of machines for fabricating and affixing bails upon cans and especially of the type which will manufacture a bail or handle out of wire stock that is automatically supplied to the machine and that will affix said manufactured bail automatically upon the ears of the can. The cans in question can be delivered to the machine by hand, continuous belt or the like. This invention also represents a further improvement on my Patent #2,154,071 and is a continuation-in-part of my patent application Serial #319,585 for "Machine for affixing and fastening bails to cans" filed February 19, 1940.

An object of this invention is to provide a machine for affixing said bails to the ears of a can. Both of said machines operating in unison and in timed relation with each other.

A further object of this invention is to provide a machine for manufacturing bails or handles out of a continuous supply of wire stock which is delivered to said machine from a wire reel.

A still further object of this invention is to provide a machine for manufacturing bails or handles out of wire stock that is delivered to the machine in ready and predetermined lengths.

A further object of this invention is to provide novel delivery means and to facilitate the delivery of the precut wire lengths to the bail manufacturing and bail affixing machine.

Other objects and advantages of my invention will be seen from the following description, in connection with the accompanying drawings disclosing a preferred embodiment thereof.

Referring to the drawings:

Fig. 1 is a top view of the bail manufacturing and bail affixing machine showing the die means for forming the bail and the mechanism for affixing the bails to the cans.

Fig. 2 is a side view of the machine showing a section of the machine and taken on the line 2—2 of Fig. 1.

Fig. 3 is a section taken on the line 3—3 of Fig. 1, showing the mechanism for operating the die for forming the bail.

Fig. 4 is a detailed view of the cutting knife used to cut off the correct length of wire for forming the bail.

Fig. 5 is a detailed view of the roller mechanism for delivering the wire stock to the bail manufacturing or forming machine.

Fig. 6 is a modified arrangement for supplying wire to the bail forming machine showing the container holding the precut wire and the mechanism for delivering the wire stock to the bail forming die.

Fig. 7 is a top view of the machine shown in Fig. 6.

Fig. 8 is a section taken on the line 8—8 of Fig. 6 showing the drive for operating the delivery of the precut wire stock to the forming die.

Fig. 9 illustrates the arrangement of a can with closed ears and the bail affixed to it preliminary to bending the bail ends.

Fig. 9a illustrates the bail shown in Fig. 9 after the bail ends have been bent by the machine.

Fig. 9b illustrates a perspective view of the bail end of the bail shown in Fig. 9 before the bail end has been bent and after the bail end bend operation.

Fig. 10 illustrates a can having open ears thereon and a bail affixed to said ears in position and before the bail end bend operation.

Fig. 10a illustrates the condition of the bail shown in Fig. 10 after the bail end bend operation.

Fig. 10b illustrates a perspective view of the bail shown in Fig. 10 before the bail end bend operation and after.

Fig. 11 illustrates a can and a bail affixed to it, said bail having one bail end bent before being affixed to said can. The bent bail end is affixed to the can manually before said can being placed on the machine, the other bail end is bent automatically by the machine.

Fig. 11a illustrates the condition of the bail end shown in Fig. 11 after bending.

Fig. 11b is a perspective view of the bent bail end shown in Fig. 11, and the straight bail end before being bent and after the bending operation.

Fig. 12 is a plan view of the bail forming die showing the three stages for fabricating the crown portion of the bail proper.

Fig. 13 is a section taken on the line 13—13 of Fig. 12, showing the crown of the bail already formed and the die ready for adding the U-shaped ends to the tips of the wire bail.

Fig. 14 is the same section shown in Fig. 13, showing the U-shaped portion already formed.

Fig. 15 is a section taken on the line 15—15 of Fig. 12, showing the dies for forming the U-shaped portions of the bail in operation.

Fig. 16 is a view similar to the one shown in Fig. 15, showing the manner the bail ends are formed by the bail end forming die portion of the machine.

Fig. 17 shows the manner the finished bail is expelled from the forming dies.

Fig. 18 is a section taken on the line 18—18 of Fig. 12, showing a portion of the bail forming die and the position of the wire bail within.

Fig. 19 is a composite view showing the bail before being inserted into the ears of the can at X, and after the insertion at Y.

Fig. 20 is showing the position of the bail with the bail ends within the ears of the can after being bent.

Fig. 21 is a section 21—21 of Fig. 20, showing the position of the bail ends within the ears of the can.

Fig. 22 is a composite view illustrating the manner bail end is inserted into the ear of the can at A, and its position after the bail ends have been bent by the bail securing die portion.

Referring to Fig. 1, the machine shown comprises a combination of a bail manufacturing or forming machine, a bail affixing machine and a bail securing machine. All these three machines are built into one machine and operate in unison.

Referring to Fig. 1, 10 is the base of the bail making or forming machine. A slidably movable table 11 is reciprocally operated by means of a pair of reciprocally operated arms 12 which are in turn operated by a pair of rotating disks 13. The table 11 moves in slideways 14. The end 11a of the table 11 is shaped to correspond to the formation of the bail 15. The table 11 represents the male member of the bail forming machine. The female member 16 of the machine 10 is located opposite the table 11. The wire 15a used for forming the bail 15 is delivered to the machine 10 by a set of rollers 17. After the required length of wire is delivered it is chopped off from the wire reel by a cutting knife 10b which is operated through a reciprocal motion and in timed relation with the other parts of the machine. The wire 15a after being cut by the knife 10b is supported upon the base 10 in position by the blocks 18.

After the wire 15a has been deposited upon the blocks 18 and cut off, the male member 11 is pushed forward and compresses the wire 15a into the female member 16. When this operation is completed, a pair of reciprocally operated dies 19 and 20 descend upon the end of the already formed bail 15. This operation gives a U-shaped formation 15b to the ends of the bail 15. Upon completion of this operation, the ends 15c of the U-shaped bent part 15b of the bail 15 are bent rectangular to the bail 15. This operation is accomplished by a set of two horizontally movable dies 21 and 22. The motion of the dies 21 and 22 is accomplished through the medium of oscillating arms 23 and 24. The arms 23 and 24 are oscillated by the motion of the rocking member 25 and the connecting arms 26 and 27.

When the bail 15 is completely formed a set of five pistons 28 is moved downwards. This operation expels the bail 15 from the female member 16 through the opening 29 in the base of the bail forming machine 10.

When the bail 15 is completely expelled from the bail forming machine 10, it drops upon the slidably mounted table 30 of the bail affixing machine 31. The operation of the bail affixing machine 31 is similar to the one described in my Patent No. 2,154,071, and requires no further explanation.

Referring to the modified arrangement for delivering ready cut wire to the bail forming machine as shown in Figs. 6, 7 and 8, a wire basket 32 is attached to the base 10 of the bail forming machine. The wire basket 32 consists of a tapered cone-shaped member 33. The wall 34 of the basket 32 is slotted and holds a slidably mounted flat plate 35 which is attached to a sliding member 36 that carries a pair of bearings 37. A pair of operating oscillating arms 38 are hingeably held at 39 by the bearings 37. The other ends of the arms 38 are attached at 40 to a pair of rotating disks 41 that are turned by the shaft 42. The shaft 42 is operated by a belt and pulley 42a from the main drive of the machine.

The wires W are stored inside the tapered basket 33 and are expelled through a narrow slot 43 upon a pair of rotating delivery disks 44. The disks 44 are attached to a shaft 45 that is rotated by a pair of bevel gears 46 and a drive shaft 47 that is operated by the main drive of the machine (not shown). The periphery delivery of the disks 44 is evenly divided (in this case, it is divided into eight parts) and has grooves 48 cut into it to help receive the wires W. As the delivery disks 44 rotate, only one length of wire W at a time can be accommodated inside the grooves 48 so that only one wire at a time can be delivered for each individual operation of the machine. When the wire W reaches the exit opening 43a, the wire is discharged upon the base 10 of the machine and rests upon the blocks 18 ready to be formed into a wire bail. The operation of the shaft 47 is timed with the operation of the rest of the machine so that only one wire at a time is delivered to the die and one bail at a time is affixed upon the can.

During the operation of the machine, the sliding plate 35 that is oscillated by the arms 38 which are attached to the rotating disks 40, prevents the wires W from sticking in place within the basket 32. In short, the wires are continuously stirred and mixed during the operation of the machine to prevent sticking.

Fig. 9 illustrates one form of wire bail which can be fabricated and used in connection with the wire affixing machine 10. Fig. 9 illustrates the condition of the bail at the time it has been affixed by the machine 10 to the can C. In Fig. 9a, it is shown the final form of the bail 15 after the ends of the bail have been bent by the bail bending means of the machine 10. Fig. 9b illustrates a perspective view of the ends of the bail A before it has been formed and A¹ after the bending operation.

Fig. 10 illustrates another form of wire bail as produced and used in connection with the machine 10. Fig. 10 shows the condition of the bail after being affixed to the ears E of the can C. Fig. 10a is showing the condition of the ends of the bail after the bending operation. Fig. 10b is illustrating a perspective view of the end of the bail B before the bending operation and B¹ after it has been bent.

Fig. 11 illustrates a further form of wire bail. In this case, one end 15c of the bail 15 is bent beforehand. The end 15c of the bail 15 is, therefore, manually affixed to the ear E of the can C. The straight end 15d of the bail 15 is thereafter inserted into the other ear E¹ of the can C. Both of these operations are done manually, whereupon the can C is placed under the endless belt 25a of the bail end bending machine 10a for the purpose of bending the straight end 15d of the bail 15. It can be seen that the bail manufacturing and affixing machine as shown in Figs. 1 to 8 inclusive, can be also used in cases where the bails have been already prefabricated and all that is required is to attach said bails to the ears E of the can C.

Fig. 11a illustrates the condition of both bail ends of the bail 15 after the bending of the bail end 15d by the bail bending machine 10a. Fig. 11b is a perspective view of the ends of the bail 15. D illustrates the condition of the bent end 15e of the bail 15; D¹ illustrates the condition of the straight end 15d of the bail 15, and D¹¹ illustrates the condition of the straight end 15d after bending.

Referring to Fig. 12, there is shown the male die portion of the machine 11 and the female die portion 16 in position ready for forming the crown of the bail from the wire 15a supplied to the die from a reel (not shown).

The dotted position 11b of the male die portion illustrates the manner the wire 15a is formed into a bail crown 15ax. The final position 11c of the forming die completely ends the operation of the forming dies upon the crown of the finished bail 15. In this stage the crown of the bail is already formed although the tips of the bail are not yet ready.

In Fig. 13, there is shown the first stage of operation in forming the ends or tips of the bail and in Fig. 14, there is shown the final stage of operation. In this view the end forming die 19 is shown forming the ends of the bail proper.

In Figs. 15 and 16 is illustrated the manner the ends of the bail are bent into a hook-like extension. This operation is accomplished through the sliding motion of the dies 21 and 22. In Fig. 15 the dies 21 and 22 are not yet in operation, while, in Fig. 16, the dies are shown in operation with the bail ends 15c already bent.

In Fig. 16, there is illustrated the manner the finished bail is expelled from the forming die ready to be attached to the ears of the can C. In Fig. 19, position X, shows the finished bail before insertion into the ears E of the can C, and position Y shows the bail ends within the ears of the can C, but, before bent. In Fig. 20 the ends of the bail (the ends 15b) are bent and the bail is permanently attached to the can.

In the composite Figure 22 there is illustrated the manner the end 15b of the bail is inserted into the ear of the can and its position after the end 15b has been bent through the operation of the bail affixing dies 10a.

The operation of the bail end bending machine 10a is similar to the operation of the machine as shown and described in my application Serial No. 319,585, filed February 19, 1940, and requires no further explanation. It is understood that variations of this machine may be resorted within the scope of the invention and parts of the improvements may be used without others. And now, having described my invention, what I claim is:

1. A machine for fabricating and for permanently securing wire bails to cans, including a male and a female die means for forming wire into bails by the operation of said male die upon the female die means, horizontally and vertically movable die means also included for forming the ends of said bail into hook-like extensions, reciprocally operatable means for expelling the fabricated bail from said machine, and means for inserting the ends of the bail into the ears of the can and for bending said ends inside the ears of the can aforesaid.

2. A machine for affixing and for permanently securing wire bails to the ears of cans or the like containers including means for supplying wire to a bail forming die, for bending said wire into a bail form, and for twisting the ends of said bail into hook-like extensions; means included for expelling the ready bail from said forming dies and attaching the ends of said bail to the ears of said cans, and twisting means for twisting the hook-like extensions of the bail inside said ears of said cans.

3. A machine for affixing and permanently securing bails to ears of cans including in combination a forming die for forming the bail proper and for fabricating the ends of said bail into hook-like extensions, and means for expelling said ready bails from said forming dies and twisting the ends of said bails inside the ears of said cans; said bail forming dies and said bail end twisting dies operated in time relation to the bail expelling means aforesaid.

4. A bail manufacturing machine including forming dies for fabricating the body of the bail proper into a half round bow-shaped formation, both ends of said bail bent into U-shaped hook-like extensions facilitating attachment of said bail ends to the ears of said cans; means for expelling said bails from said forming dies and means for affixing said bail to the ears of said cans, said bail expelling and affixing means being operable in timed relation with the operation of the forming dies aforesaid.

THOMAS GORMAN, Jr.